Sept. 15, 1936.　　S. R. SHOUP ET AL　　2,054,103
VOTING MACHINE
Original Filed June 28, 1930　　14 Sheets-Sheet 3
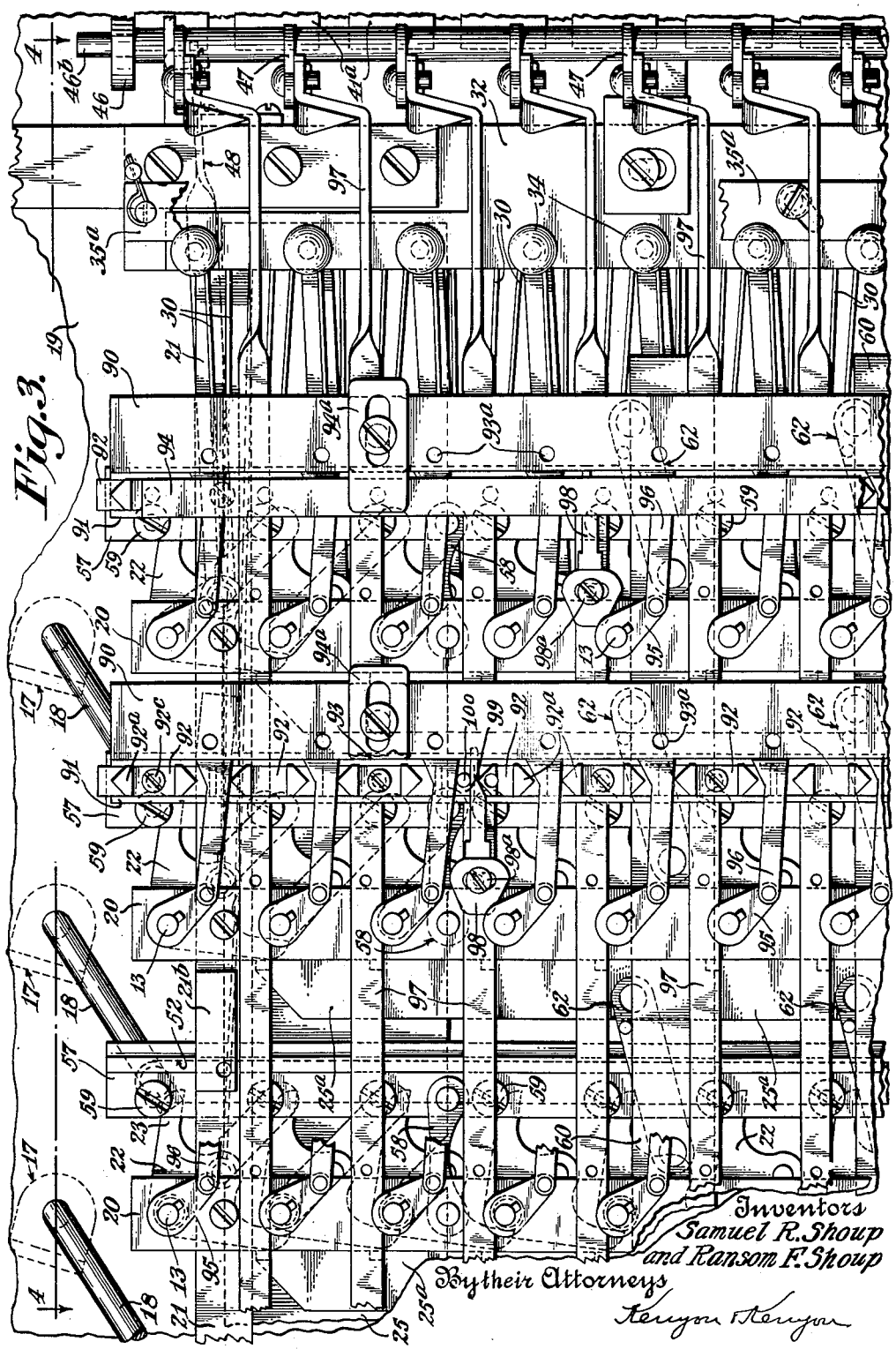

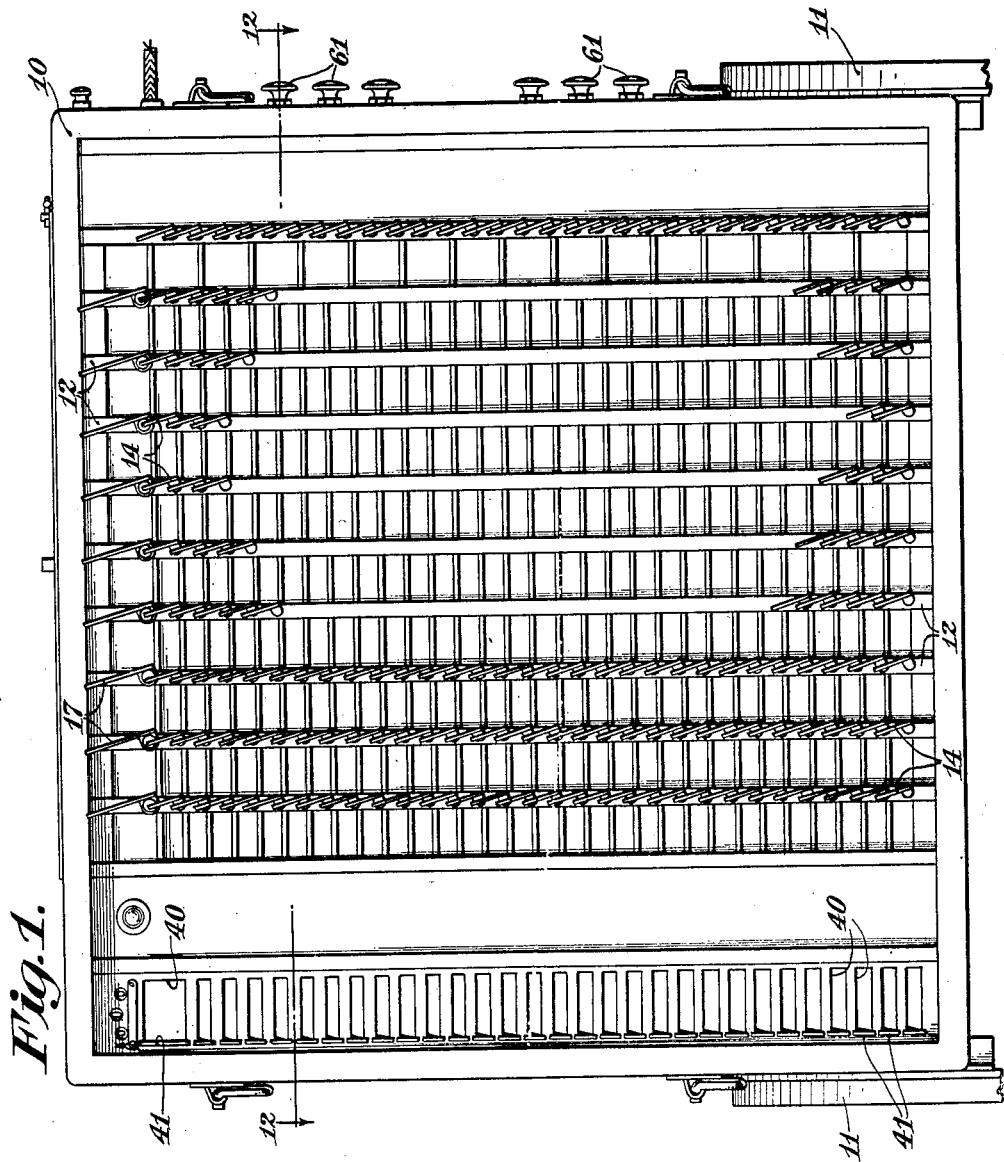

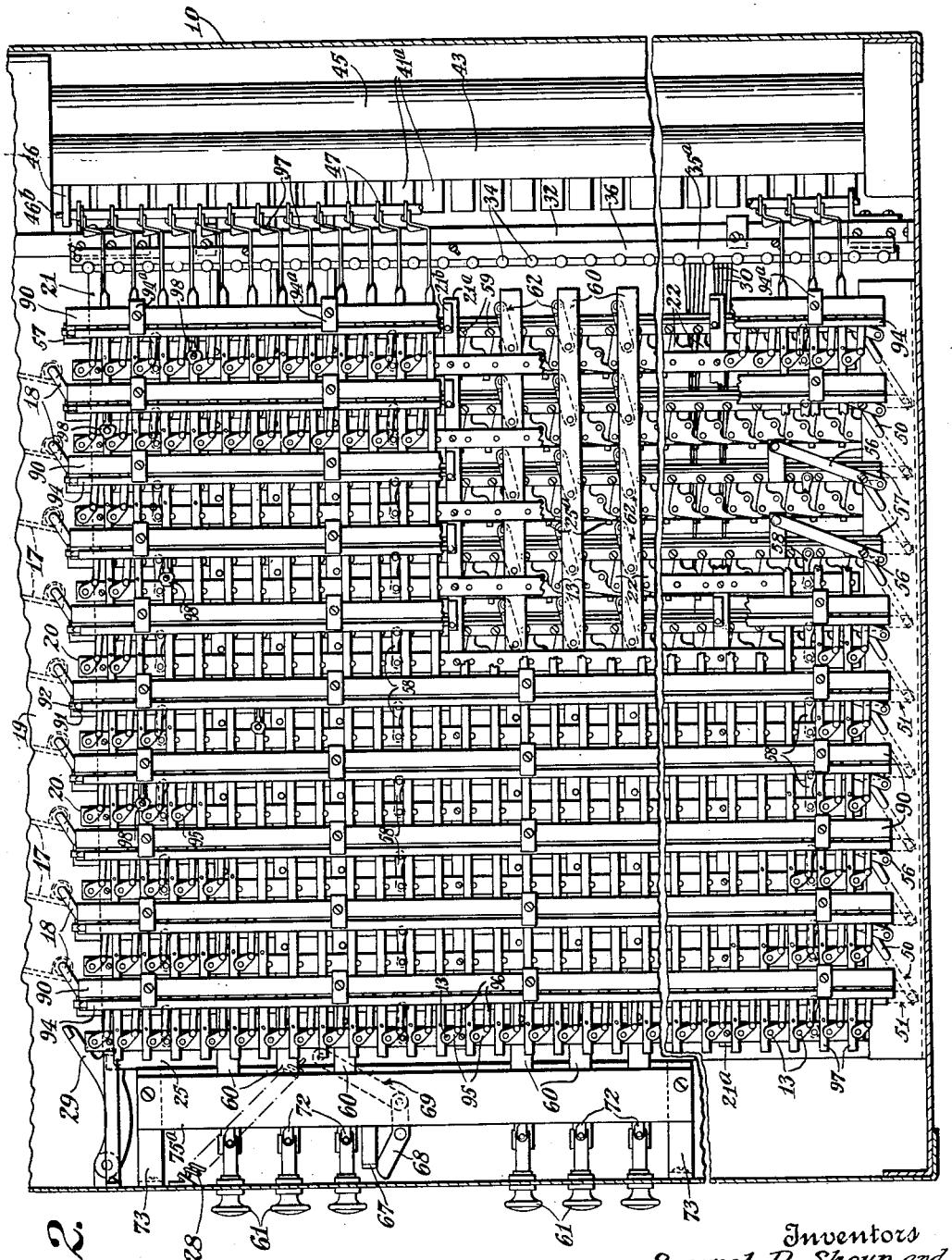

Sept. 15, 1936.　　　S. R. SHOUP ET AL　　　2,054,103
VOTING MACHINE
Original Filed June 28, 1930　　14 Sheets-Sheet 4
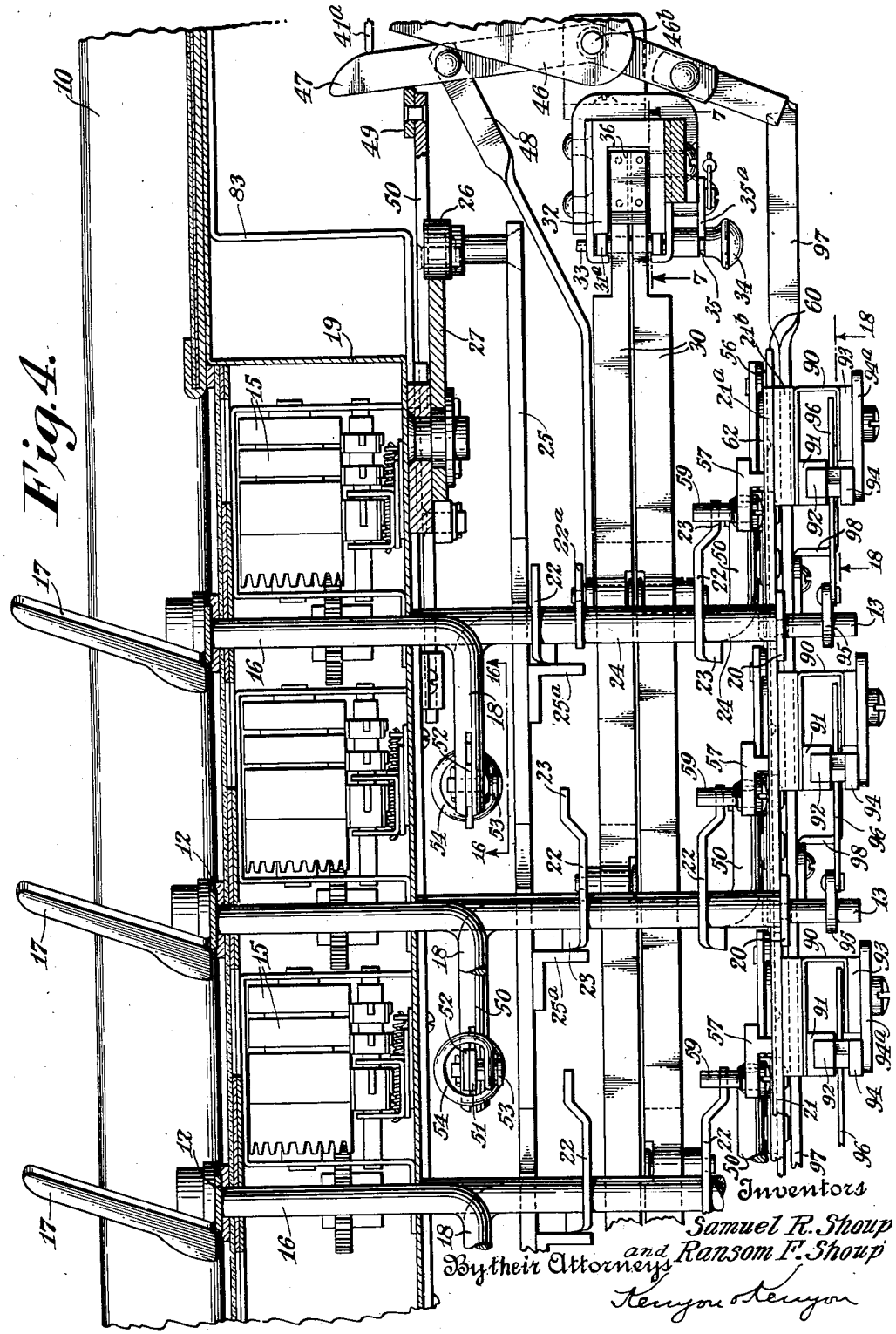

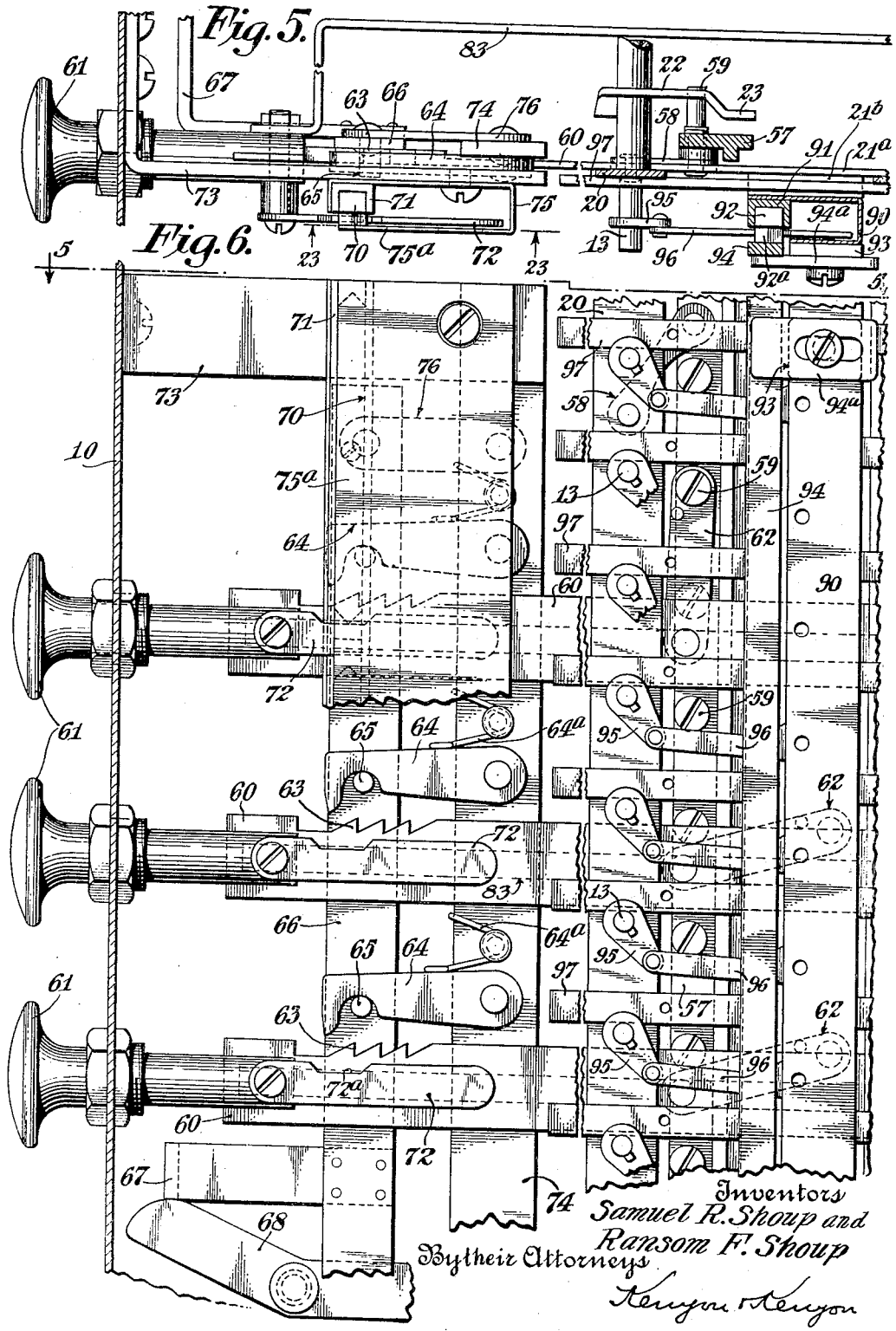

Sept. 15, 1936.  S. R. SHOUP ET AL  2,054,103
VOTING MACHINE
Original Filed June 28, 1930   14 Sheets-Sheet 6
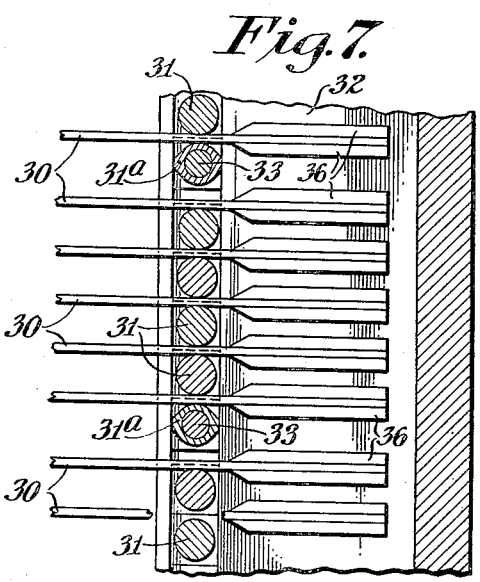
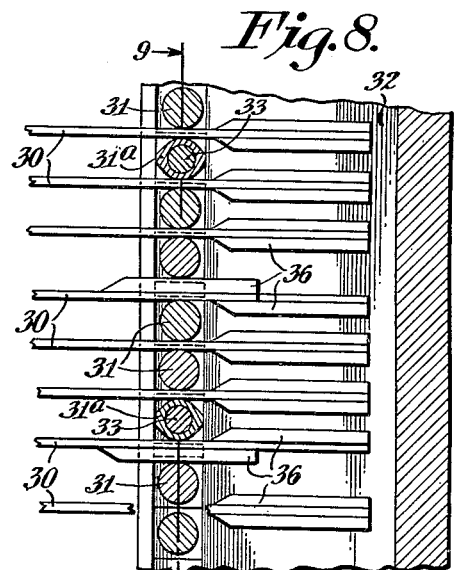
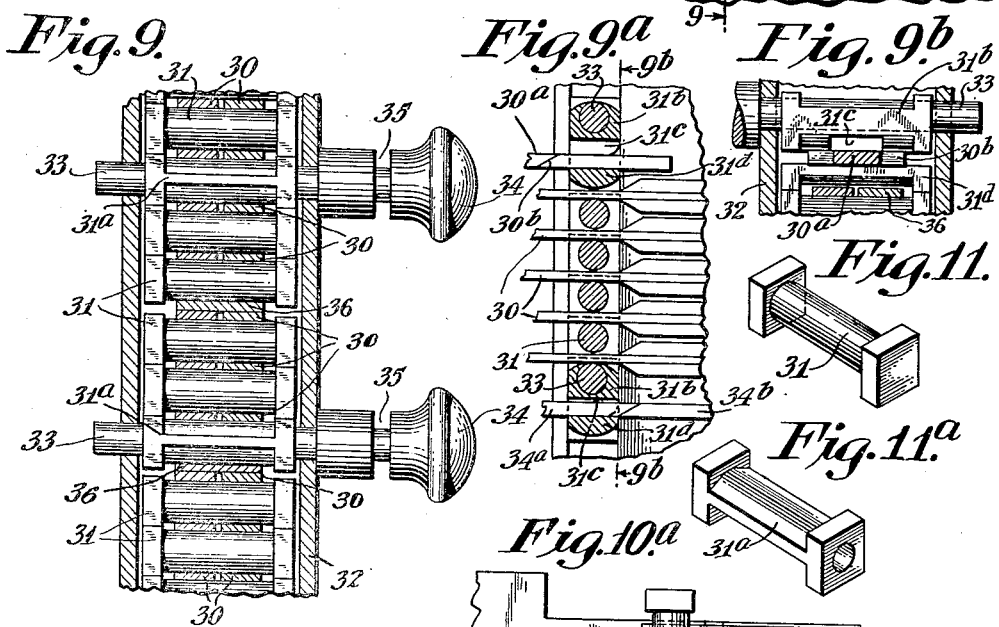
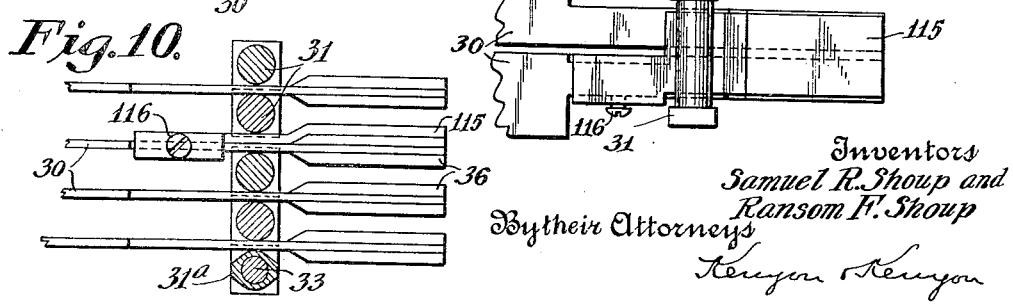
Inventors
Samuel R. Shoup and
Ransom F. Shoup
By their Attorneys
Kenyon & Kenyon Sept. 15, 1936. S. R. SHOUP ET AL 2,054,103
VOTING MACHINE
Original Filed June 28, 1930 14 Sheets-Sheet 7
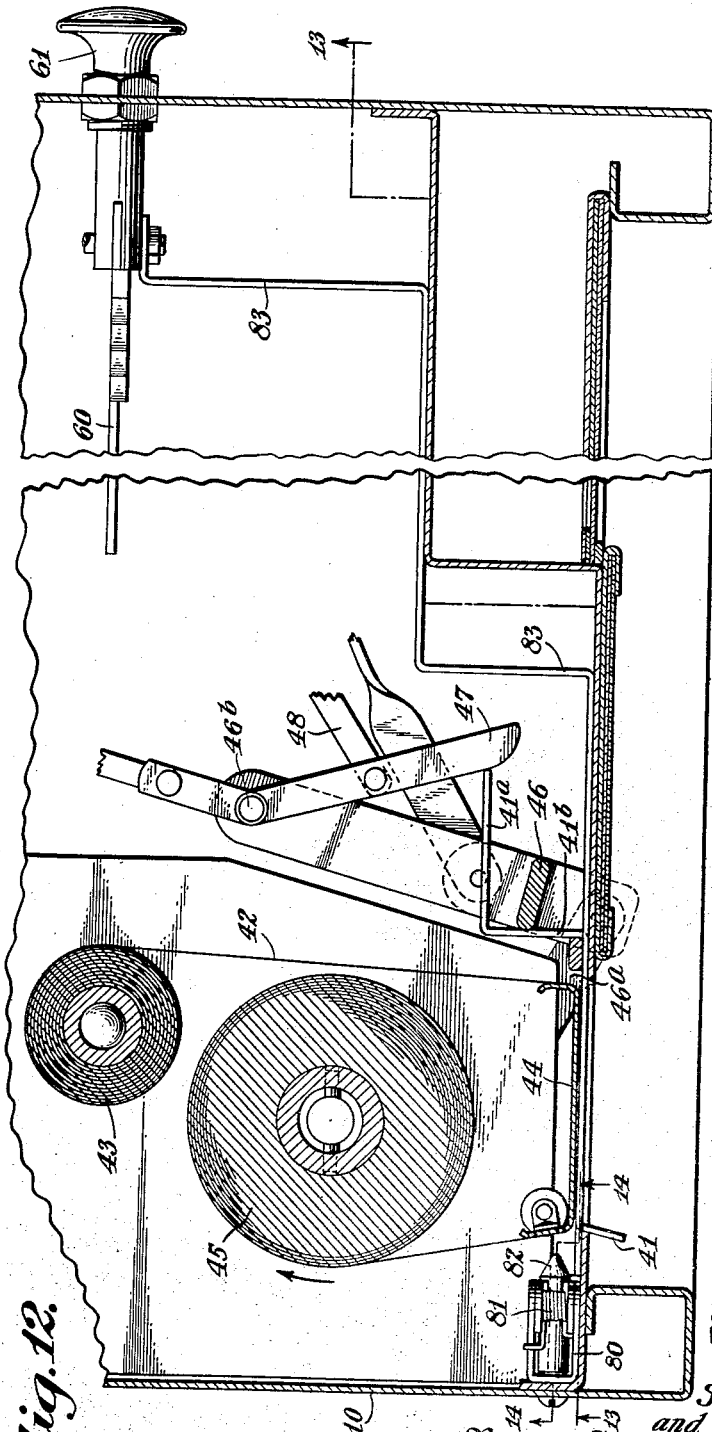
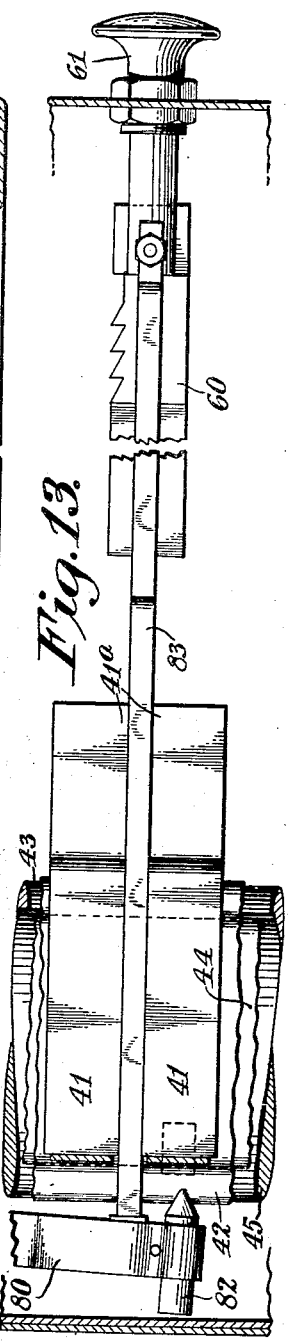
Inventors
Samuel R. Shoup
and Ransom F. Shoup
By their Attorneys
Kenyon & Kenyon

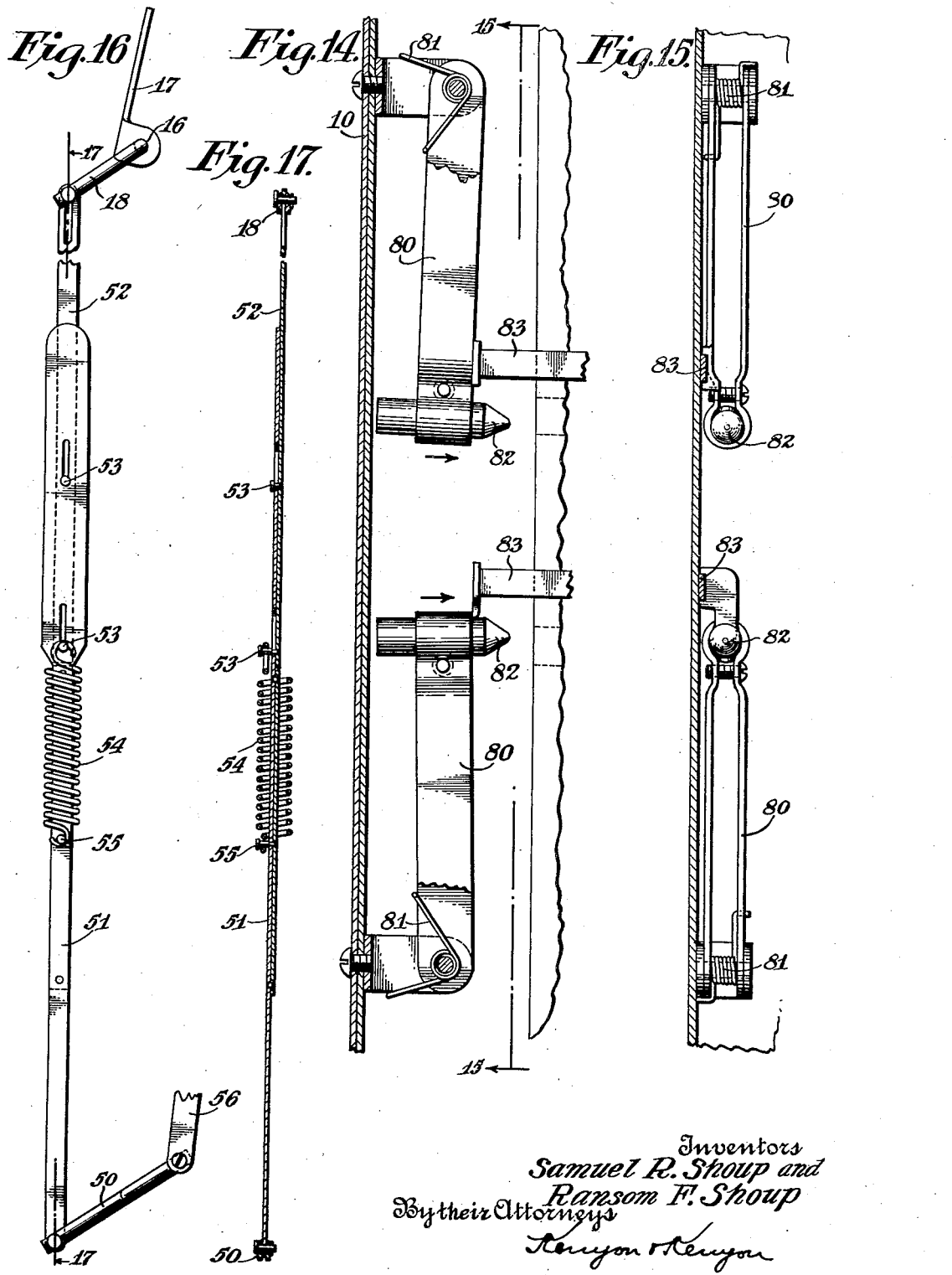

Sept. 15, 1936.    S. R. SHOUP ET AL    2,054,103
VOTING MACHINE
Original Filed June 28, 1930    14 Sheets-Sheet 9
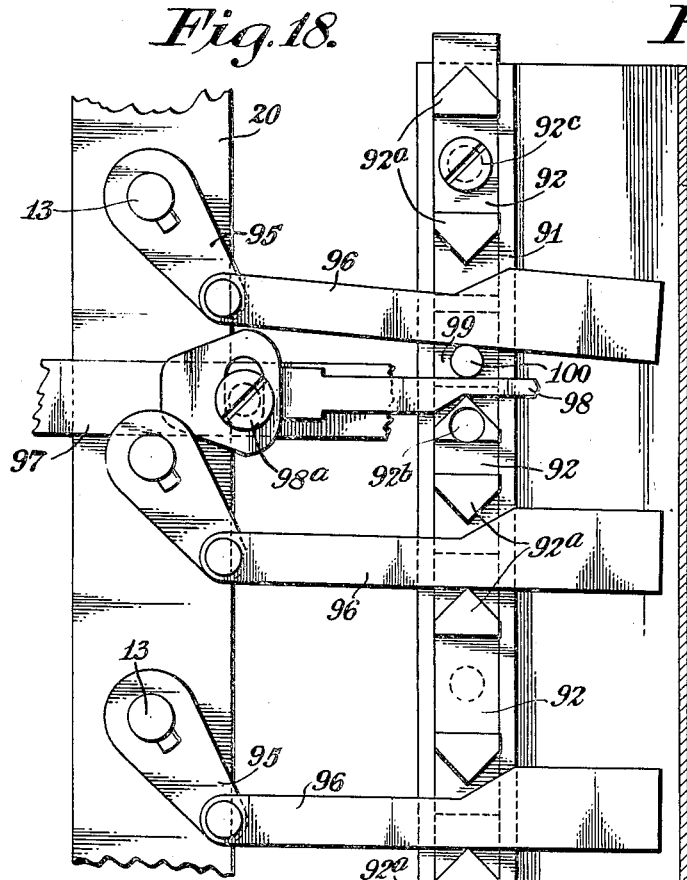
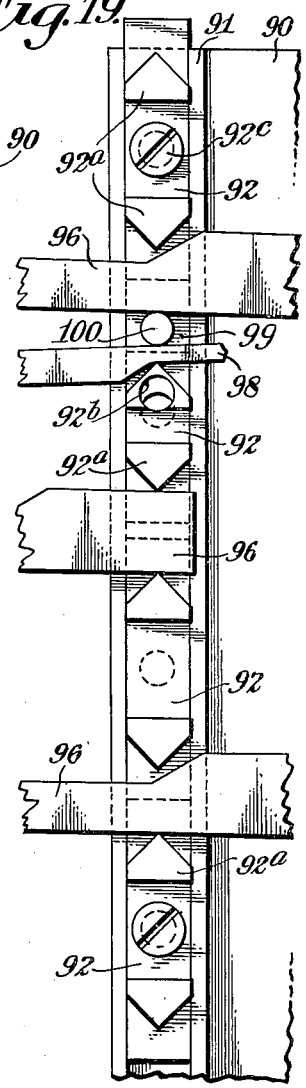
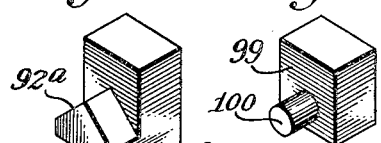
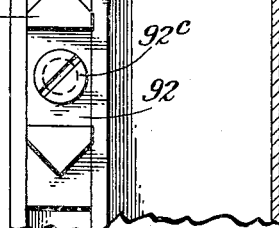
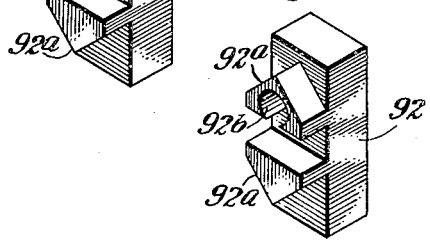
Inventors
Samuel R. Shoup and
Ransom F. Shoup
By their Attorneys
Kenyon & Kenyon

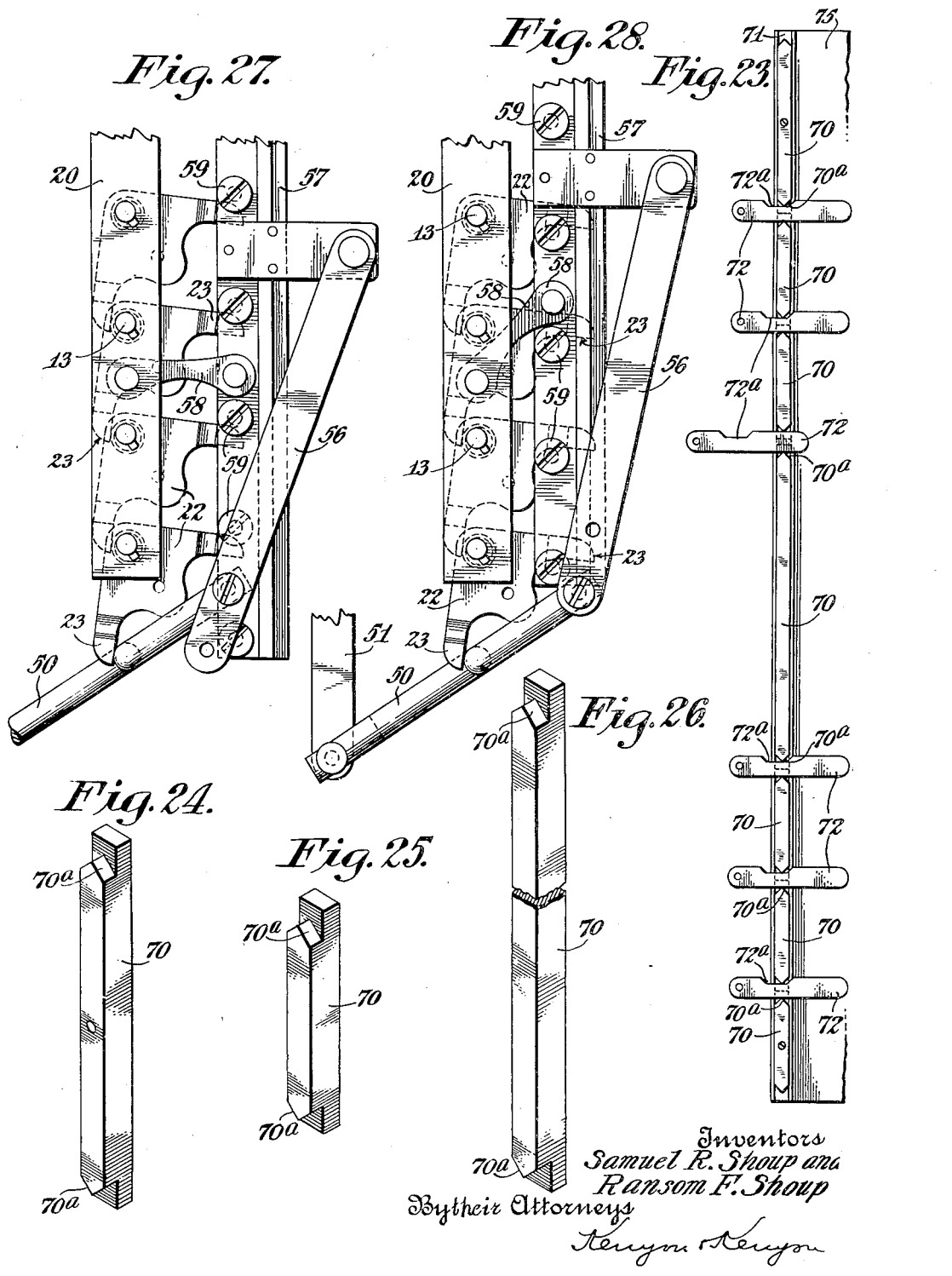

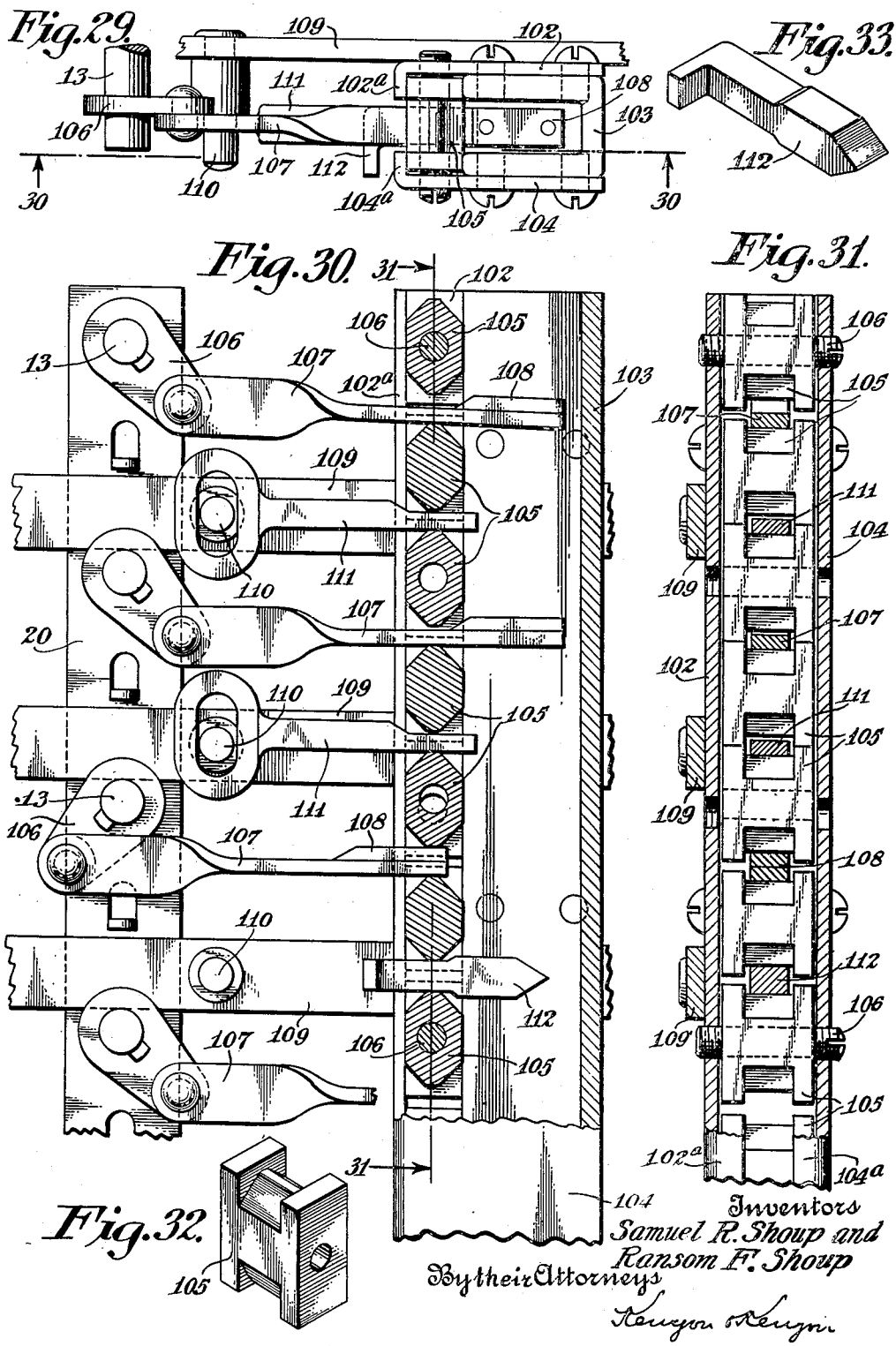

Sept. 15, 1936.   S. R. SHOUP ET AL   2,054,103
VOTING MACHINE
Original Filed June 28, 1930   14 Sheets-Sheet 12
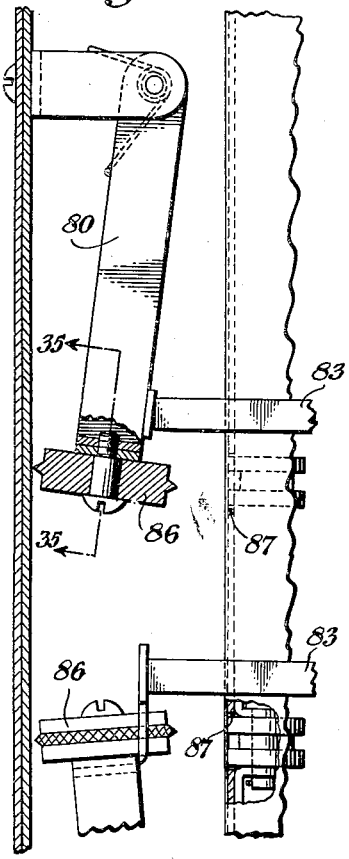
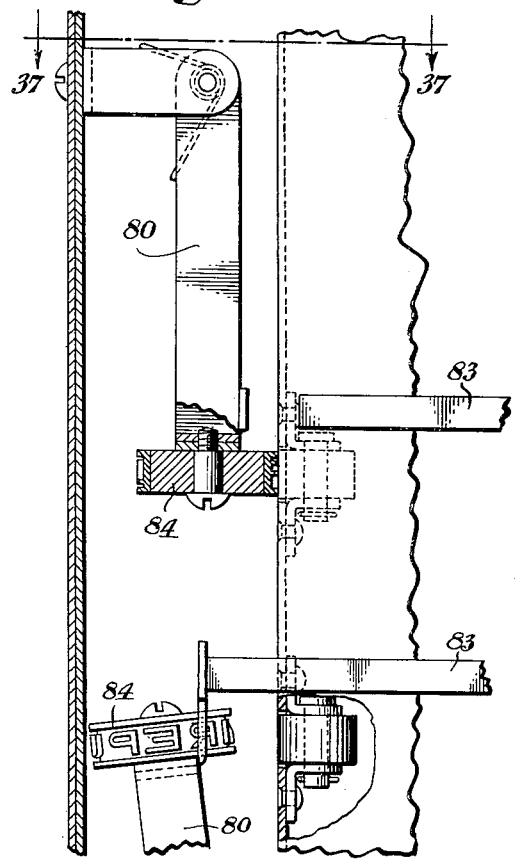
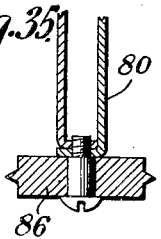
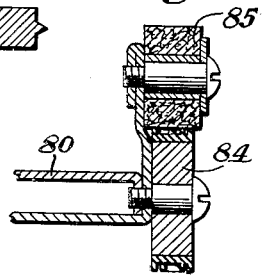
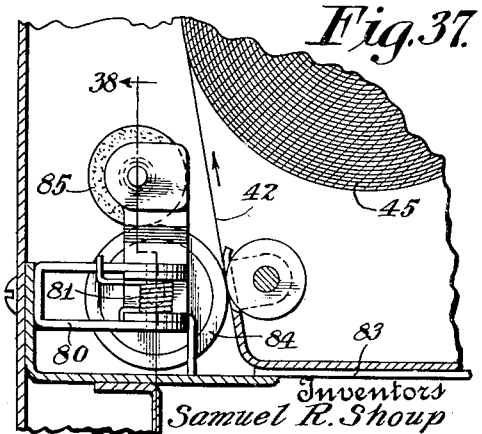
Inventors
Samuel R. Shoup
and Ransom F. Shoup
By their Attorneys
Kenyon & Kenyon Sept. 15, 1936.   S. R. SHOUP ET AL   2,054,103
VOTING MACHINE
Original Filed June 28, 1930   14 Sheets-Sheet 13
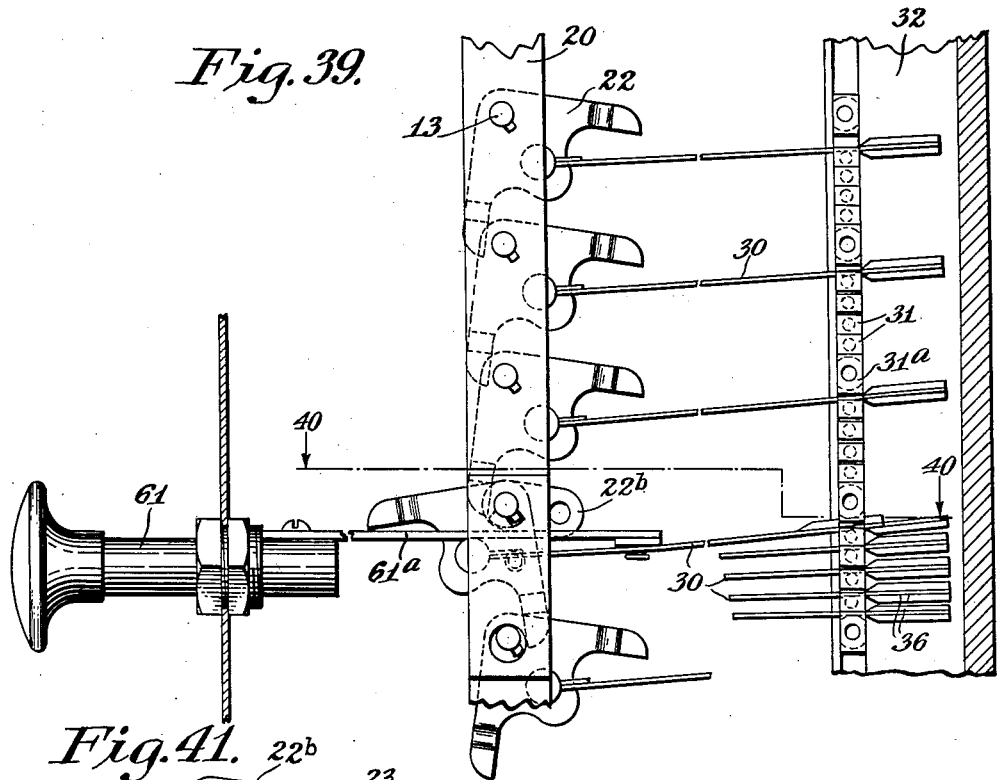
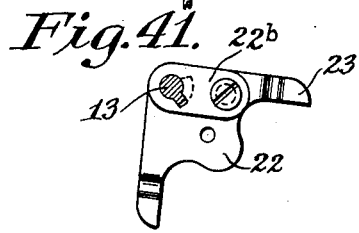
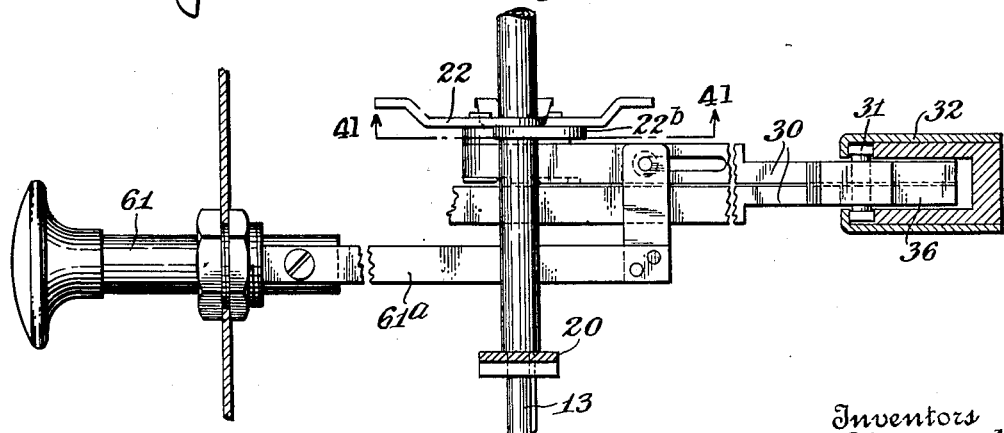

Sept. 15, 1936.   S. R. SHOUP ET AL   2,054,103
VOTING MACHINE
Original Filed June 28, 1930   14 Sheets-Sheet 14
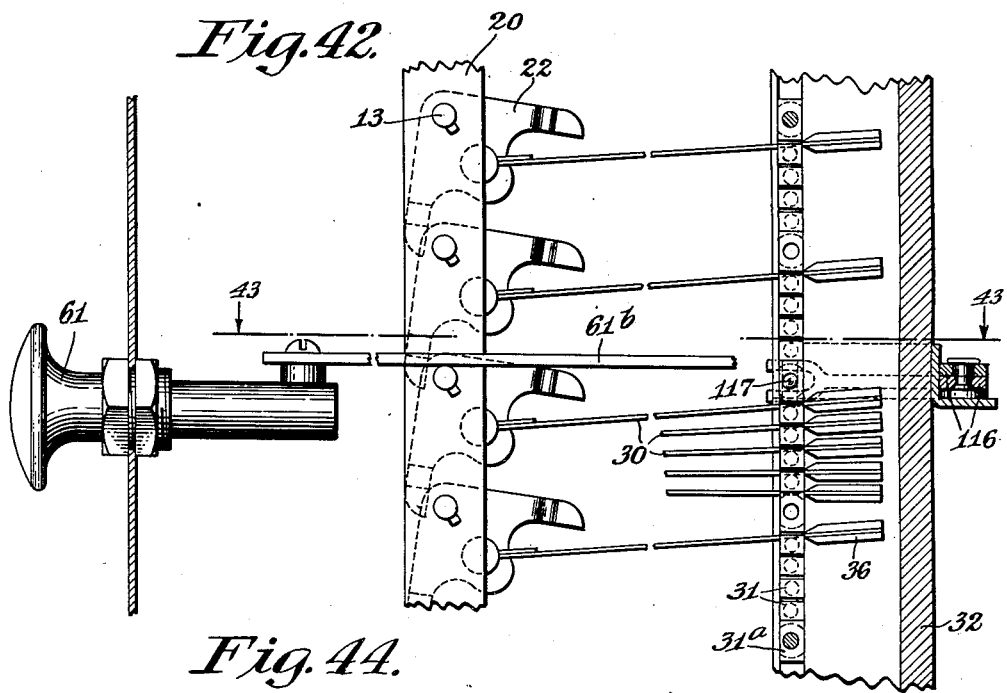
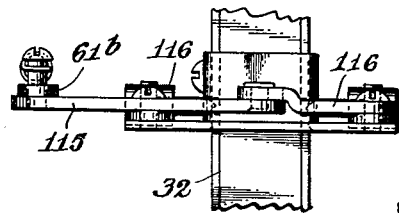
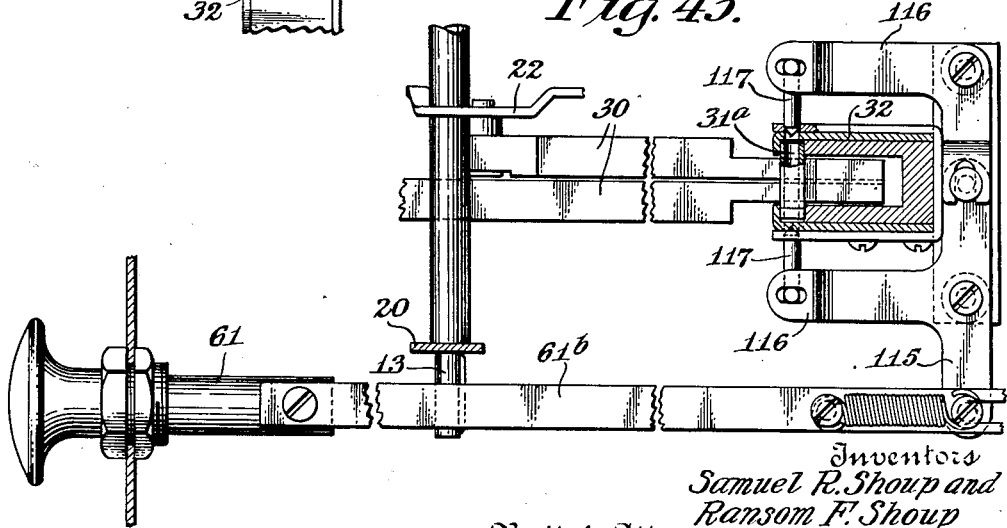
Inventors
Samuel R. Shoup and
Ransom F. Shoup
By their Attorneys
Kenyon & Kenyon Patented Sept. 15, 1936

2,054,103

UNITED STATES PATENT OFFICE 2,054,103

VOTING MACHINE

Samuel R. Shoup and Ransom F. Shoup, Weehawken, N. J., assignors to The Shoup Voting Machine Corp., Union City, N. J., a corporation of New Jersey Application June 28, 1930, Serial No. 464,460
Renewed May 24, 1935

31 Claims. (Cl. 235—54)

This invention relates to voting machines and has for an object an improved machine which may be used for primary voting, party ballot voting and Australian party voting, the machine being so designed and constructed that it may be readily set up for any of these types of voting or may readily be converted from a set-up for one type of voting to a set-up for another type of voting.

A voting machine embodying this invention comprises several columns of voting handles by which counters may be actuated. With party ballot voting, the names of the candidates for any office are allotted to handles in horizontal rows, while with Australian ballot voting, the names of the candidates for any office are allotted to vertical groups of voting handles. Two separate lock-out mechanisms are provided, one of which controls horizontal rows of voting handles, while the other controls vertical groups of handles. The party ballot lock-out mechanism limits the number of voting handles that can be operated in any horizontal row, while the Australian ballot lock-out mechanism limits the number of handles that can be operated in any vertical group. Change of control of the voting handles from one type of lock-out mechanism to the other type of lock-out mechanism may be made without any material re-arrangement of the parts of the machine. Also, part of the machine may be set up for Australian ballot voting and the remainder of the machine be set up for party ballot voting.

When the machine is to be used for primary voting, a plurality of columns of voting handles are allotted to each political party. The machine is provided with means operable from the exterior of the machine for locking the voting handles. This machine is so arranged that an attendant can release the columns allotted to any particular political party, while the columns allotted to the other political parties remain locked. The voter states which political party he is affiliated with and the attendant releases the columns allotted to that particular political party. The voter can then actuate the handles in these columns, but cannot actuate the handles in the columns allotted to the other political parties.

The machine is equipped with means for permitting a voter to register a personal choice, that is, to vote for someone whose name is not included in the list of candidates. The personal choice mechanism is suitably interlocked with the remaining mechanism so that it is impossible to vote for a greater number of candidates for any office than the allotted number. For primary voting, the personal choice mechanism is provided with means for indicating the political party of the voter making the personal choice.

Other objects, novel features and advantages of this invention will be apparent from the following specification and accompanying drawings, wherein:

Fig. 1 is a front view of a voting machine embodying the invention.

Fig. 2 is a rear view thereof with the back removed;

Fig. 3 is an enlarged fragmentary view similar to Fig. 2.

Fig. 4 is a section on the line 4—4 of Fig. 3.

Fig. 5 is a section on the line 5—5 of Fig. 6;

Fig. 6 is an enlarged fragmentary section similar to Fig. 2.

Fig. 7 is a section on the line 7—7 of Fig. 4;

Fig. 8 is a view similar to Fig 7, with the parts in different position;

Fig. 9 is a section on the line 9—9 of Fig. 8;

Fig. 9—a is a view similar to Fig. 9 of a modification.

Fig. 9—b is a section on the line 9—b—9—b of Fig. 9—a.

Fig. 10 is a fragmentary view similar to Fig. 7 of a modification.

Fig. 10—a is a plan view of the same.

Figs. 11 and 11—a are perspective views of parts of the lockout mechanism;

Fig. 12 is a section, partly broken away, on the line 12—12 of Fig. 1;

Fig. 13 is a section on the line 13—13 of Fig. 12;

Fig. 14 is a fragmentary section on the line 14—14 of Fig. 12;

Fig. 15 is a section on the line 15—15 of Fig. 14;

Fig. 16 is an elevation of a portion of the machine viewed from the line 16—16 of Fig. 4;

Fig. 17 is a section on the line 17—17 of Fig. 16;

Fig. 18 is an enlarged fragmentary section on the line 18—18 of Fig. 4;

Fig. 19 is a similar section with the parts in a different position.

Figs. 20, 21 and 22 are perspective views of parts of the lockout mechanism shown in Figs. 15 and 19;

Fig. 23 is a reduced fragmentary section on the line 23—23 of Fig. 5;

Figs. 24, 25 and 26 are enlarged perspective views of details shown in Fig. 23;

Figs. 27 and 28 are fragmentary views illustrative of different connections between various parts of the machine;

Fig. 29 is a fragmentary view similar to Fig. 5 of a modified form of lockout mechanism;

Fig. 30 is a section on the line 30—30 of Fig. 29;

Fig. 31 is a section on the line 31—31 of Fig. 30;

Figs. 32 and 33 are perspective views of parts of the mechanism disclosed in Figs. 29-31, inclusive;

Fig. 34 is a view similar to Fig. 14 of a modification;

Fig. 35 is a section on the line 35—35 of Fig. 34;

Fig. 36 is a view similar to Fig. 14 of a further modification;

Fig. 37 is a section on the line 37—37 of Fig. 36;

Fig. 38 is a section on the line 38—38 of Fig. 37.

Fig. 39 is a fragmentary rear view of a part of the primary voting mechanism;

Fig. 40 is a section on the line 40—40 of Fig. 39.

Fig. 41 is a section on the line 41—41 of Fig. 40;

Fig. 42 is a view similar to Fig. 39 of a modification;

Fig. 43 is a section on the line 43—43 of Fig. 42, and

Fig. 44 is a fragmentary end elevation.

The voting machine, which is the subject of this application, is an improvement on the voting machine disclosed in applicants' co-pending application, Ser. No. 380,839, filed July 26, 1929. The basic principle of operation of the two machines is the same, but the present machine embodies some changes of structure and also additional mechanism enabling the present machine to perform operations which the original machine could not perform. The present machine may be used for party ballot or Australian ballot voting and also for primary voting. Except for changes in the lockout mechanism and in the straight ticket mechanism, the present machine resembles the former machine with respect to party ballot voting. With respect to primary voting, the present machine is essentially different from the former machine. Also, the present machine contains additional mechanism to adapt it for Australian ballot voting.

Referring now more especially to Figs. 1 to 4, the voting machine comprises a box-like casing 10, (Fig. 1), which is supported by a frame 11. A plurality of bars 12 extend vertically of the casing and in these bars are journalled the front ends of spindles 13 to which are attached handles 14. These spindles are operatively connected to counters 15. Near the top of each bar 12 there is journalled a spindle 16 to the front end of which is attached a handle 17 and the rear end of which extends at right angles and forms an arm 18. The spindles 13 and 16 extend through a partition 19 and the rear ends of the spindles 13 are journalled in vertical straps 20, supported by a horizontal strap 21, and interconnected by horizontal straps 21ᵃ. To each spindle are keyed one or more actuators 22 having arms 23. The actuators 22 are held in spaced relation by sleeves 24.

An obliquely reciprocating locking and restoring frame 25 is provided with lugs 25ᵃ to engage the arms 23 either to prevent clockwise rotation of the spindles or to return them to position after they have been operated in voting. This frame is provided with oblique slots through which the spindles 13 extend and act as supports for the frame. The locking and restoring frame 25 is provided with a roller 26 which is engageable with a vertical bar 27 having oblique slots through which extend studs carried by the partition 19, and at the other end of the frame 25 there is provided a spring 28 which tends to lift the frame 25 and pull the same to the left. Up and down movement of the bar 27 causes coincident movement to the left and right. A latch 29 normally engages the frame 25 to prevent movement thereof under the influence of the spring 28. The bar 27 is lifted upwardly and downwardly by a horizontally reciprocable cam bar (not shown) which at one end of its stroke trips the latch 29.

The reciprocation of said cam bar is controlled by the voter and causes the operation of the frame 25 to release the spindles to permit a voter to actuate the same subject to the action of the lockout mechanism subsequently to be described and to restore the operated spindles and lock all the spindles against rotation until the next voter operates the machine. The mechanism just described and its operation is disclosed in detail in applicants' co-pending application, Ser. No. 380,839.

The lockout mechanism above referred to comprises draw bars 30 detachably connected to the actuators 22 (Figs. 4, 7 to 11). The draw bars 30 pass in pairs between locking members 31 and 31ᵃ having their ends slidably received in grooves provided in a vertical guide 32. The locking members 31ᵃ are tubular and are held against movement by pins 33 passing therethrough and through apertures in the guide 32. As this machine is provided with nine columns of voting handles for party ballot voting and a personal choice voting mechanism later to be described, the draw bars 30 are arranged in groups of five pairs and there is a locking member 31ᵃ for each four locking members 31. The pins 33 are provided with heads 34 having circular grooves 35 which receive the edge of a bar 35ᵃ mounted on the guide 32 for oblique movement. A limited amount of movement of the locking member 31 is permitted and the locking members are provided with rectangular heads thereby making it possible to limit accurately the distance two locking members may be moved apart. The rectangular heads may be machined to the exact size required and as the contact between adjacent locking members will always be along flat horizontal surfaces, the distance which any two locking members can be moved apart will always be constant. The bar 35ᵃ, when in place, serves to prevent withdrawal of the pins. Each draw bar 30 has at one end a portion passing between a pair of locking members and provided with an enlarged head or wedge 36, each head or wedge being equal in width to the combined width of the two draw bar portions, one wedge or head extending downwardly and the other wedge or head extending upwardly from its draw bar and a portion of each head or wedge overlapping the other draw bar in sliding relation. Sufficient play is provided between the locking members of each group to permit one wedge or head only to be drawn in between a pair of locking members. After one head has been drawn in between a pair of the locking members, the entire play is taken up so that another draw bar cannot be actuated. Thus, the turning of any one of the spindles in a horizontal row or the actuation of the corresponding personal choice voting slide, later to be described, operates a draw bar 30 to bring the head 36 between the locking members, thus taking up the slack and preventing the operation of any of the remaining voting handles in the same horizontal row. The heads 36 of each pair of draw bars are arranged at opposite sides of the draw bars and have overlying portions so that the draw bars may be laid side by side in a compact arrangement.

To enable a voter to cast his ballot for someone whose name does not appear on any of the ballots, there is provided a personal choice mechanism (Figs. 1, 3, 4, 12 and 13). A column of apertures 40 is provided in the front wall of the casing 10. These apertures are closed by slides 41. A strip of paper 42 is provided on which the personal choice may be written after a slide 41 has been opened. This strip of paper passes from a feed roll 43 around a guide plate 44 and to a take-up roll 45, the guide 44 being located directly behind the column of apertures. Each slide 41 is formed with an offset portion 41a connected by an intermediate portion 41b. The intermediate portion 41b is arranged to engage the vertical portion of a yoke 46 by means of which rotation of the rollers 43 and 45 is controlled, through a link 46a. The yoke 46 is journalled on a vertical rod 46b on which are also journalled a plurality of levers 47. One end of each lever 47 extends into the path of the offset portions 41a of a slide 41 and is caused to swing thereby when the slide 41 is opened. A link 48 extends from each lever 47 to an actuator 22a, rotatably mounted on the corresponding spindle 13 of the first column and connected to a draw bar 30. Thus, when a slide 41 is opened, the corresponding draw bar 30 is actuated, thereby preventing the operation of any of the handles 14 in the corresponding horizontal row. A vertical bar 49 is supported by reciprocating horizontal bars 50 which are connected to the bar 27 for horizontal reciprocation therewith. The slides 41 are returned to normal position by the yoke 46 and when returned to normal position, permit return of the corresponding levers 47 by means of the bar 49 which is adapted to engage any lever 47 which has been actuated. The return of the yoke 46 to normal position effects rotation of the roller 45 to advance the paper 42. The manner of actuating the yoke is disclosed in Serial No. 380,839.

The arms 18 of the spindles 16 are connected by an extensible link with levers 50 pivotally mounted near the bottom of the casing 10, (Figs. 16 and 17). Each link comprises a bar 51 connected at one end to the lever 50 and a bar 52 connected at one end to the arms 18, the bar 51 having slots through which extend headed pins 53 carried by the bar 52. A helical spring 54 surrounds the two bars and has one end connected to one of the pins 53 and its other end connected to a pin 55 carried by the plate 51. The levers 50 are connected by links 56 with vertical bars 57 supported from the straps 20 by pairs of pivoted arms 58. Each link 56 has two holes in its lower end and the lever 50 is connected thereto by a pin passing through the upper hole, the bar 57 being thus capable of combined horizontal and vertical movement (Figs. 3, 27 and 28). Each bar 57 is provided with a column of pins 59 having threaded portions which screw into threaded recesses in the bars. The pins 59 are adapted to engage the upper edges of arms 23 of the actuators 22. This arrangement provides means for voting a straight ticket, (Figs. 4 and 27). A voter, merely by operating one handle 17 may actuate the entire column of spindles. Actuation of a key in any column locks the corresponding keys in the other columns and thus prevents movement of the bar 57 for straight ticket voting. Should a voter have turned a handle 14 in a column and then attempt to operate the handle 17 for another column, the link will expand and permit turning of the handle 17, but the bar 57 will not move. Injury to the machine is thus avoided. It is impossible to vote a straight ticket after a handle has been turned in another column. However, after the handles 14 of a column have all been rotated by operation of the corresponding handle 17, any handle 14 may be returned to normal position and the corresponding handle of another column operated. In returning a handle 14, the corresponding bar 57 will be returned to original position. Should there not be enough candidates to necessitate the use of the entire column of spindles the pins 59 for the unused spindles may be removed. Thus, the only counters actuated are those corresponding to voting handles which have been allotted to candidates.

The portion of the machine heretofore described is adapted for party column ballot voting. Normally, the restoring frame 25 is in the position shown in Figs. 2 and 4 and in that position locks the handles 14 and the slides 41 against operation. The restoring frame 25 is moved to release the spindles by the spring 28 after the bar 27 has been moved to the left and the latch 29 tripped by the mechanism described and disclosed in detail in the application, Ser. No. 380,839. The handles 14 and the slides 41 may now be operated. However, the operation of any handle in one horizontal row, or the operation of the slide in the corresponding row, prevents operation of any other handle in that row or if a handle has been operated it prevents the operation of the corresponding slide 41. This is due to fact that the operation of a handle 14 or a slide 41 draws a bar 30 to position the head 36 between the locking members and thus prevent movement of another draw bar. Voting for a number of candidates from a larger group may be permitted by removal of one or more of the pins 33. After a voter has registered his selection by turning the proper handles, or using the personal choice mechanism, the bar 27 is caused to move to the right, thus returning the restoring frame to its original position and at the same time returning the handles 14 and the slides 41 to their original position. The machine is then ready for the next voter.

Means are provided for adapting the machine for use in primary election voting. Sliding bars 60 extend across the bank of spindles and are provided with operating knobs 61 which project beyond the side wall of the casing 10 (Figs. 2, 5 and 6). Each bar 60 is provided with a plurality of links 62, there being a link 62 for each vertical bar 57. The bars 57 are normally so arranged that the pins 59 do not prevent operation of the actuators 22, but when the machine is set for primary voting, these bars are lifted so that the pins underlie the arms 23 of the actuators and prevent rotation thereof. The bars 57 are held in elevated position by the links 62 which are arranged nearly vertical with their upper ends connected to the bars by means of the pins 59 which pass through holes in the end of the links (Fig. 6). Also the pin connecting the link 57 to the arm 50 is arranged in the lower hole (Fig. 28).

The position of the handles 17 is therefore unchanged. As long as a bar 60 remains in the position shown in Fig. 6, the vertical bar to which it is connected will be held in elevated position with the pins 59 engaging the arm 23, thus preventing actuation of the handles 14. Movement of a bar 60 to the left will draw down the corresponding vertical bar and permit actuation of the handles 14 in the corresponding column. At the same time, the corresponding handle 17 will be turned downwardly, indicating that the spindles of that column have been released.

When the machine is to be used for primary election, a certain number of columns are alloted to each party and the vertical bars 57 corresponding to such columns are connected by links 62 to the same bar 60. When a voter enters the machine, the attendant pulls out the knob 61 corresponding to the bar 60 controlling the column or columns allotted to the political party to which the voter has declared himself to belong. The vertical bars for these columns are moved downwardly, thus removing the pins 59 out of the path of the arms 23. The turning down of the handles 17 indicates to the voter the columns allotted to his party and in which he may turn the handles 14. The voter may actuate the handles in the party columns, and also the personal choice machines the same as in party ballot voting.

Means are provided for preventing the attendant from pushing in the knob 61 after a voter has entered the machine and has conditioned the same for voting. This means comprises a ratchet 63 on each bar 60 and spring actuated pawls 64 adapted to engage said ratchets to prevent inward movement of the bars. (Figs. 5 and 6). These ratchets are held in inoperative position by pins 65 carried by a vertically reciprocating bar 66 which is provided with an arm 67 engaging one end of a pivoted lever 68, the other end of which is connected by a link 69, with the frame 25. Thus, when the frame 25 is moved to voting position by the spring 28, the lever 68 is rotated and permits the springs 64ª to force the pawls 64 into engagement with the ratchets 63.

Means are also provided for preventing the attendant from releasing the columns of more than one political party. This means comprises a plurality of locking members 70 slidably mounted in a vertical channel member 71 and draw-bars 72. The top and bottom locking members are locked in fixed position and the intermediate locking members are capable of limited sliding movement. The locking members have flat end faces and angular contact shoulders 70ª. A pair of brackets 73 extend from the side wall of the casing 10 and a bar 74 connects the ends thereof. A plate 75 extends between the bars and is supported thereby. This plate carries the channel member 71 and has a portion 75ª bent over to engage the locking members 70 to hold them in the channel member. The pawls 64 and springs 64ª are mounted on the bar 74 while the bar 66 is supported from the bar 74 by links 76. The draw bars 72 extend between the contact shoulders 70ª and each draw bar has a short section 72ª of narrower width than the remainder. When these narrow short sections are in vertical alignment, there is permitted limited play of the locking members (Figs. 5 and 23 to 26). This limited play is sufficient to permit the movement of one draw bar to position its wider portion between the shoulders of the adjacent locking members but is insufficient to permit more than one of the draw bars to be thus moved. Therefore, after one knob has been pulled out another cannot be pulled out unless the first one is returned.

The personal choice voting mechanism is operable in primary voting in the same manner as with the party ballot with the addition that means are provided for identifying the personal choice selection with a certain political party. Two or more arms 80 are pivotally supported from the casing 10 adjacent the guide 44 and are provided with springs 81 which tend to force the free ends of the arms towards the paper 42 (Figs. 12 to 15). At the end of each arm there is provided a crayon 82 and preferably these crayons are of different colors. A rod 83 extends from each knob 60 and engages each arm 80 normally to hold the crayon out of engagement with the paper. However, when a knob 60 is pulled out, the corresponding arm 80 is released and its crayon engages the paper. Thus, when a voter registers a personal choice the color of the mark on the paper will indicate the party with which he is affiliated. Also, since the arms are arranged at different heights the height of the mark on the paper may be used to indicate the party and crayons of the same color may be used. Instead of crayons, printing rollers 84 may be mounted on the end of the arms and the inking rollers 85 provided so that the name of the party may be printed on the paper (Figs. 36 to 38). Likewise, a perforating roller 86 may be mounted on the end of the arms and apertures 87 may be provided in the guide 44 so that the paper will be perforated and the height of the perforations will indicate the party with which the voter is affiliated (Figs. 34 and 35).

This machine may also be used in connection with the Australian type ballot and a separate lockout mechanism is provided for adapting the machine for voting with the Australian ballot. The lockout mechanism for the party column ballot is rendered inoperative by removing all the pins 33 or by disconnecting the draw bars 30 from the actuators 22 and also disconnecting the links 48 from the levers 47. (Figs. 4 and 7.)

When the machine is used with the Australian type ballot, the names of the candidates for any office or board are vertically arranged, each candidate's name being in alinement with a voting handle 14. The interlocking mechanism is of such character that it may easily be adjusted to meet any requirements and to permit several different groups of candidates to be arranged in a single column.

At the right of each column of spindles, (Figs. 4, 5 18–22), a plate 90 is supported by the cross bars 21ª. These plates are spaced rearwardly slightly from the cross bars by spaces 21ᵇ and each plate carries a vertical channel member 91 in which are provided locking members 92. Each plate 90 is provided with a return bend portion by which is supported a bar 93. A second bar 94 overlies the locking members 92 and is supported from the bar 93 for lateral adjustment by brackets 94ª. The locking members 92 are provided with contact shoulders 92ª and with holes 92ᵇ through which may be inserted bolts 92ᶜ to hold them in fixed position in the channel member. Each spindle 13 is provided with an arm 95 to which is attached a draw bar 96 extending across the channel member and having an enlarged head. A plurality of horizontal bars 97 rest on the spindles and are attached at one end to the levers 47. Each bar 97 is provided with a series of threaded holes spaced apart a distance equal to the distance between the columns and providing means whereby plungers 98 may be connected to the bars where desired by bolts 98ª. Each plunger 98 has a short section of narrow width from which an oblique shoulder leads to the wider portion or head of the plunger. Between the plunger 98 and superposed draw bar 96 there is provided a locking member 99 having a cylindrical stud 100 with which the edges of the plunger and draw bar contact. The locking member 92 arranged above the draw bar connected to the spindle corresponding to the first candidate in a group and the locking member underlying the draw bar connected to the spindle corresponding to the last candidate in a group are held in fixed position by screws 92ᶜ. The intermediate locking members are of proper size to permit the insertion of one or more heads of draw bars or plungers between the contact portions. The size of the locking members and the position of the holes therein vary according to the conditions which are to be complied with and by the use of proper locking members all conditions of voting may be met. Where one candidate is to be selected from a group, the arrangement is such that only one draw bar or plunger can be actuated and where more than one candidate may be voted for, the arrangement is such that a corresponding number of draw bars or plungers may be operated. The locking members have rectangular heads thereby insuring accurate and uniform spacing. The locking members may be easily replaced or rearranged by releasing the bolts that hold the brackets 94ª and moving the bar 94 to the left, thus exposing the channel member 91. Holes 93ª are provided in the bar 93 through which pins may be inserted to lock the draw bars, if desired.

Referring now to Figs. 29 to 33, inclusive, there is disclosed therein a modified form of lockout mechanism for the Australian ballot. A plate 102 is carried by the cross bars 21 in the same manner as the plate 91 previously referred to. This plate has an upturned edge 102ª and supports a vertical channeled member 103. The channel member 103 supports a plate 104 having an upturned edge 104ª. The edges 102ª and 104ª form vertical grooves with the edges of the channel member 103. A plurality of locking members 105 are mounted in the grooves above referred to, the alternate locking members being provided with apertures through which may be inserted screws 106 to hold the same against vertical movement, apertures being provided in the plates 102 and 104 to receive such screws. The locking members 105 are provided with rectangular heads which are connected by contact portions of less width than the heads. The spindles 13 are provided with arms 106 to which are attached draw bars 107 extending through the space provided between the contact portions of adjacent locking members. The draw bars 107 are provided with enlarged heads 108. A plurality of horizontal bars 109 rest upon the spindles and are attachable at one end to the levers 47 (not shown). Each bar 108 is provided with a series of studs 110 spaced apart a distance equal to the distance between the columns. These studs are adapted to extend through slots formed in the ends of plungers 111, which plungers have portions of reduced thickness extending between the contact portions of adjacent locking members. The plungers 111 may be easily and quickly placed wherever they are desired and may also easily and quickly be removed. The locking member 105 arranged above the draw bar connected to the spindle corresponding to the first candidate in a group and the locking member underlying the draw bar connected to the spindle corresponding to the last candidate in said group are held in fixed position by the screws 106. The intermediate locking members are of proper size to permit the insertion of one or more heads of draw bars or plungers between the contact portions of the locking members. Where one candidate is to be selected from a group the arrangement is such that only one draw bar or plunger can be actuated. Where more than one candidate may be voted for, the arrangement is such that a corresponding number of draw bars or plungers may be operated. The locking members may easily be replaced or rearranged by removing the plate 104. However, the number of draw bars or plungers which may be actuated in any one group may be varied by the use of a wedge 112. In the arrangement disclosed in Figs. 30 and 31, two draw bars or plungers may be actuated. However, if the wedge 112 were withdrawn then three draw bars or plungers might be actuated. Likewise, if a wedge double the size of the wedge shown were to be inserted, then the number of draw bars or plungers which could be actuated would be correspondingly reduced. The provision of the wedges makes it possible to change the operation of the lockout mechanism without changing the lockout members or changing the arrangement in any way. The wedge 112 will not work its way out due to the fact that it has an enlarged head and for it to work out it would necessitate the lifting of all the locking members above it. The provision of two heads for the locking members, each head being arranged in a groove, prevents tilting of the locking members and insures accurate and uniform operation.

The last column of spindles is provided for voting on propositions. These spindles have their own lockout mechanism which is in general similar to the Australian ballot type lockout mechanism previously described. There is no connection between the last column of spindles with any other part of the machine, except the locking and restoring frame 25. A pair of spindles is allotted to each proposition and operation of one spindle registers a favorable vote, while operation of the other registers an unfavorable vote.

The number of draw bars 30 actuatable in any group may be varied by means of the adjuster shown in Figs. 10 and 10—a. This adjuster consists of a plate 115 shaped to overlie the head 36 of a draw bar 30 and is held in place by a set screw 116. This plate is of proper thickness to reduce by one the number of draw bars that can be pulled in between the locking members 31. By attaching such adjuster to the draw bars, the number of draw bars actuatable in any group may be varied without any change in the locking members 31 or pins 33.

The number of columns of spindles may be increased over that shown in Fig. 2 by means of the modified structure disclosed in Figs. 9a and 9b. In this modification, the locking members 31ª (Fig. 9) are replaced by locking members 31ᵇ having heads of less height than the heads of the locking members 31ª and having transverse grooves 31ᶜ. There is also provided an additional locking member 31ᵈ, the combined height of heads 31ᵇ and 31ᵈ equalling the height of the heads of the locking members 31ᵃ. A draw bar 30ᵃ has a portion of the same width as the groove 31ᶜ and a portion of greater width forming the shoulders 30ᵇ. The narrow portion of the draw bar 30ᵃ is normally received in the groove 31ᶜ, but when it is pulled to the left, the shoulders 30ᵇ engage the locking member 31ᵇ and lift it to lock out the other draw bars in the manner previously described.

When the machine is used for the election of delegates to the presidential nominating conventions, the machine is used in the manner described in connection with primary voting. The different political parties may elect different numbers of delegates to their conventions. To take care of this situation, means are provided for changing the number of draw bars of a group that may be operated.

In the modification disclosed in Figs. 39 to 41, one of the pull rods 61 above described is connected by a link 61ᵃ with a draw bar 30 through the medium of a pin and slot connection. Thus, when the pull rod is operated as described above in connection with primary voting, the draw bar is moved to the left, thereby reducing by one the number of draw bars that may be operated by actuation of the voting keys by the voter. Thus, the same lock-out mechanism may be used in connection with voting for different numbers of delegates. One of the actuators 22 is connected to the draw bar 30 to which the link 61ᵃ is connected. This actuator is rotatably mounted on its spindle instead of being keyed thereto as are the other actuators. However, when the machine is used for party balloting the actuator is fastened to an arm 22ᵇ keyed to the spindle (Fig. 41). The actuator then operates in the same manner as the other actuators, this being permitted by the pin and slot connection between the link 61ᵃ and the draw bar 30.

It may be that one party elects both men and women as delegates, there being a fixed ratio between the men and women, while the other party elects only men. Under these circumstances, it is necessary when a voter of the first party has to register his ballot that he be unable to vote for more than the allotted number of women or men delegates. The arrangement disclosed in Figs. 42 to 43 takes care of this situation.

In Figs. 42 and 43 one of the pull rods 61 is connected by a link 61ᵇ with the arm 115 of a pair of interconnected bell crank levers 116. The free ends of the bell crank levers carry pins 117 which are substantially in alinement with a tubular locking member 31ᵃ. When the pull rod 61 is actuated the pins are projected into the locking member and fixed against movement. This divides the larger group of locking members into smaller groups, one of which is allotted to women candidates and the other to men candidates. The number of men candidates as well as the number of women candidates that can be voted for are limited by this arrangement.

It is of course understood that various modifications may be made in the apparatus above described, without in any way departing from the spirit of the invention as defined in the appended claims.

We claim:

1. In a voting machine, a plurality of columns of voting spindles, an arm carried by each spindle, vertical bars having projections engageable with said arms, means for supporting said bars for vertical reciprocation, horizontal drawbars, links connecting selected vertical bars to each drawbar, a ratchet and pawl mechanism for locking each bar in operated position, a keeper for normally rendering said ratchet and pawl mechanisms inoperative, and means for releasing and restoring said keeper.

2. In a voting machine, a plurality of columns of voting spindles, an arm carried by each spindle, vertical bars having projections engageable with said arms, means supporting said bars for vertical reciprocation, horizontal drawbars, links connecting selected vertical bars to each drawbar, a rotatable handle at the top of each column, a pivoted lever for each column, connections between corresponding levers and handles, and connections between corresponding levers and vertical bars.

3. In a voting machine, means for supporting and feeding a strip of paper, a plurality of means engageable with said paper for producing indicia thereon, a like number of drawbars and means controlled by said drawbars for selectively actuating said indicia producing means.

4. In a voting machine, a plurality of columns of voting spindles, an arm carried by each spindle, vertical bars having projections engageable with said arms, means for supporting said bars for vertical reciprocation, horizontal drawbars, links connecting selected vertical bars to each drawbar, means for supporting and feeding a strip of paper, means individual to each drawbar engageable with said strip of paper to produce indicia thereon, and means controlled by each bar for rendering inoperative the corresponding indicia producing means.

5. In a voting machine, a plurality of rows of voting spindles, an arm carried by each spindle, bars parallel to said rows and having projections engageable with said arms, means for supporting said bars for swinging movement, drawbars, links connecting selected vertical bars to said drawbars, means for supporting and feeding a strip of paper, means individual to each drawbar engageable with said strip of paper to produce indicia thereon, and means operable by each bar for rendering inoperative the corresponding indicia producing means.

6. In a voting machine, a plurality of columns of voting spindles, an arm carried by each spindle, vertical bars having projections engageable with said arms, means for supporting said bars for vertical reciprocation, horizontal drawbars, links connecting selected vertical bars to said drawbars, a strip of paper, means for supporting and feeding said paper, a pivoted arm for each drawbar, indicia producing means carried by each arm, means tending to swing said arms to engage said indicia producing means with said paper, and means carried by each drawbar for maintaining inoperative the corresponding indicia producing means.

7. In a voting machine, means for supporting and feeding a strip of paper, a plurality of drawbars, a like number of pivoted levers, indicia producing means carried by said levers, resilient means for swinging said levers to bring the indicia producing means into contact with said strip of paper, and an arm carried by each drawbar and engaging the corresponding lever for holding the latter in inoperative position when the drawbar is in normal position.

8. In a voting machine, means for supporting and feeding a strip of paper, a plurality of pivoted levers, indicia producing means carried by said levers, resilient means for swinging said levers to bring the indicia producing means into contact with said strip of paper, an arm carried by each drawbar and engaging the corresponding lever for holding the latter in inoperative position when the drawbar is in normal position, a ratchet and pawl mechanism for locking each bar in operated position, a keeper for maintaining said ratchet and pawl mechanisms inoperative, and means for releasing and restoring said keeper.

9. In a voting machine a plurality of columns of spindles, a locking member for each column of spindles, a plurality of drawbars selectively connected to said locking members, a strip of paper, means for supporting and feeding said paper strip, indicia producing means individual to each drawbar and engageable with said paper strip, and means operable by each drawbar for rendering inoperative the corresponding indicia producing means.

10. In a voting machine, a plurality of columns of spindles, a locking member for each column of spindles, a plurality of drawbars selectively connected to said locking members, a strip of paper, means for supporting and feeding said strip of paper, means individual to each drawbar for engaging said paper to produce indicia thereon, resilient means tending to move the indicia producing means into contact with the paper, and means associated with each drawbar for normally holding said indicia producing means in inoperative position.

11. In a voting machine, a plurality of columns of voting spindles, a locking member for each column, drawbars selectively connectible to said locking members, a strip of paper, means for supporting and feeding said paper strip, means individual to each drawbar adapted to engage said paper strip to produce indicia thereon, and means controlled by said drawbars for selectively actuating said indicia producing means.

12. In a voting machine, a plurality of rows of voting spindles, an arm carried by each spindle, members individual to said rows engageable with said arms to effect rotation thereof, a handle at one end of each column, a lever for each column, yieldable connections between corresponding handles and corresponding levers and connections between corresponding levers and corresponding members.

13. In a voting machine, a row of spindles, an arm supported by each spindle, a reciprocable member having projections engaging said arms, a lever at one end of said column, a link connecting one end of said lever and said member, a handle at the other end of said column, an extensible link connecting said handle and the other end of said lever, and resilient means opposing extension of said link.

14. In a voting machine, a row of spindles, an arm supported by each spindle, a reciprocable member having projections engaging said arms; a lever at one end of said column, a link connecting one end of said lever and said member, a link having one end connected to said lever, a handle at the other end of said column, a link having one end connected to said handle, a pin and slot connection between said last two links, and resilient means tending to oppose relative movement of said links.

15. In a voting machine, a plurality of columns of spindles, an arm supported by each spindle, vertical reciprocable members having projections engaging said arms, levers at one end of said columns, rotatable handles for said columns, links connecting one set of ends of said levers and said handles, links connecting the other ends of said levers and said vertical reciprocable members, said links being connectible to said vertical members at different elevations, a plurality of horizontal drawbars and links connecting selected vertical bars to said drawbars.

16. In a voting machine, a plurality of rows of spindles, an arm supported by each spindle, reciprocable members having projections engaging said arms, levers at one end of said rows, rotatable handles for said rows, links connecting one set of ends of said levers and said handles, links connecting the other ends of said levers and said reciprocable members, said links being connectible to said reciprocable members at different points, a plurality of drawbars, and links connecting selected reciprocable members to said drawbars.

17. In a voting machine, a plurality of columns of spindles, an arm supported by each spindle, vertical reciprocable members having projections engaging said arms, levers at the bottom of said columns, rotatable handles at the top of said columns, links connecting one set of ends of said levers and said handles, links connecting the other ends of said levers and said vertical reciprocable members, said links being connectible to said vertical members at different elevations, a plurality of horizontal drawbars, links connecting selected vertical bars to said drawbars, means for supporting and feeding a strip of paper, means engageable with said strip of paper for producing indicia thereon, and means carried by said drawbars for maintaining said indicia producing means normally in inoperative position.

18. In a voting machine, a plurality of voting spindles, lock-out members associated therewith, one of said lock-out members being tubular, pins in substantial alinement with said tubular lock-out members, and means for inserting said pins in said tubular member and for withdrawing the same therefrom.

19. In a voting machine, a lockout mechanism comprising a vertical guide member having grooves, a plurality of horizontal locking members having rectangular heads arranged in said grooves, said locking members having portions of less cross section than said heads forming recesses between adjacent locking members, pairs of straps arranged in said recesses, the straps of each pair being in horizontal alinement, and wedges at the ends of said straps, each wedge being equal in width to the combined width of a pair of straps.

20. In a voting machine, a plurality of columns of voting spindles, vertical bars movable into and out of position to lock said spindles against rotation, a plurality of horizontal draw bars, means for selectively connecting vertical bars to each horizontal draw bar, a rotatable handle at the top of each column and adjustable connections between each handle and vertical bar.

21. In a voting machine, a plurality of rows of voting spindles, an arm carried by each spindle, a bar parallel to each row and having projections engageable with said arms, each bar being supported by pivoted members pivotally connected to said bar, drawbars and links selectively connecting said parallel bars and said drawbars.

22. In a voting machine, a plurality of rows of spindles, a bar parallel to each row of spindles and supported for curvilinear movement, selectively engageable means on said bars and spindles, drawbars selectively connected to said parallel bars, operating handles for said parallel bars, and connections between said handles and parallel bars comprising means for differently connecting the same to arrange said parallel bars in either of two positions relative to the spindles.

23. In a voting machine, a plurality of rows of spindles, a bar parallel to each row of spindles and supported for curvilinear movement, selectively engageable means on said bars and spindles, drawbars selectively connected to said parallel bars, operating handles for said parallel bars, and connections between said handles and parallel bars comprising pivoted arms and means for connecting said pivoted arms to said parallel bars at different points.

24. In a voting machine, a plurality of rows of spindles, a pair of arms associated with each spindle, a bar parallel to each row of spindles and supported for curvilinear movement, lugs on said bars selectively engageable with the spindle arms, drawbars selectively connected to said parallel bars, operating handles for said parallel bars, and means for differently connecting said handles and parallel bars to arrange said lugs in either of two positions relative to said spindle arms.

25. In a voting machine, a plurality of rows of spindles, a pair of arms associated with each spindle, a bar parallel to each row of spindles, each bar being supported by pivoted members pivotally connected to said bar, lugs on said bars selectively engageable with said spindle arms, drawbars selectively connected to said parallel bars, operating handles for said parallel bars, and means for differently connecting said handles and parallel bars to arrange said lugs in either of two positions relative to said spindle arms.

26. In a voting machine, a plurality of rows of spindles, a locking bar for each row, drawbars selectively connected to said locking bars, a strip of paper, means for supporting and feeding said strip of paper, a plurality of means for marking said paper, and means controlled by said drawbars for actuating said marking means.

27. In a voting machine, a plurality of rows of spindles, a locking bar for each row, drawbars selectively connected to said locking bars, a strip of paper, means to support and feed said paper strip, paper marking means individual to said draw bars, and means associated with each drawbar for controlling actuation of the corresponding paper marking means.

28. In a voting machine, a plurality of rows of spindles, a locking bar for each row, drawbars selectively connected to said locking bars, a strip of paper, means for supporting and feeding said paper strip, a plurality of pivoted levers, marking means carried by said levers, resilient means for swinging said levers to bring the marking means into contact with said paper strip, and arms carried by said drawbars and engaging corresponding levers for holding the latter in inoperative position when the drawbars are in normal position.

29. In a voting machine, a lockout mechanism comprising a guide member having grooves, locking members having rectangular heads arranged in said grooves, said locking members having portions of less cross section than said heads forming recesses between adjacent locking members, pairs of straps arranged in said recesses in lateral alignment, and wedges at the ends of said straps, each wedge being equal in width to the combined width of a pair of straps.

30. In a voting machine, a lockout mechanism comprising a vertical guide member having grooves, a plurality of horizontal locking members having rectangular heads arranged in said grooves, said locking members having portions of less cross-section than said heads forming recesses between adjacent locking members, pairs of straps arranged in said recesses, the straps of each pair being in horizontal alinement, and wedges at the ends of said straps.

31. In a voting machine, a lock-out mechanism comprising a guide member having grooves, locking members having rectangular heads arranged in said grooves, said locking members having portions of less cross-section than said heads forming recesses between adjacent locking members, pairs of straps arranged in said recesses in lateral alinement, and wedges at the ends of said strap for engagement with said locking members.

SAMUEL R. SHOUP.
RANSOM F. SHOUP.